United States Patent Office 3,130,139
Patented Apr. 21, 1964

3,130,139
METHOD OF MAKING UNIFORM DISPERSIONS
OF CARBON BLACK IN POLYOLEFINS
Billy G. Harper and Jack R. Davis, Lake Jackson, Tex.,
assignors to The Dow Chemical Company, Midland,
Mich., a corporation of Delaware
No Drawing. Filed Sept. 19, 1960, Ser. No. 56,695
11 Claims. (Cl. 204—154)

This invention relates to methods for making mixtures of carbon black in polyolefins. More particularly, it relates to methods for obtaining uniform dispersions of carbon black in polyolefins.

It is known that solid polymers of olefins are especially useful materials which can be made into films, fibers and other shaped articles, coatings and adhesives. These polymers are fairly resistant to degradation caused by various external factors. It has been found that the admixture of carbon black with these polymers increases their resistance to degradation, especially degradation caused by oxidation, heat, light and weathering. The admixture of carbon black with polyolefins also increases their resistance to flow and to distortion caused by heat.

It is among the objects of the present invention to provide a new and improved method for the preparation of compositions comprising solid polymers of olefins and carbon blacks.

A further object of the present invention is the provision of a method by which dispersions of carbon black in olefin polymers can be made more uniform.

Another object of the present invention is the provision of a convenient and economical method for the production of highly uniform, intimate admixtures of olefin polymers with carbon black.

The above and other objects and advantages of the present invention are obtained in accordance with the following description.

It is found that the increased resistance of polyolefins to degradation by heat, light, oxidation and weathering is a function of the degree of uniformity of dispersion of the carbon black in the polymer. In accordance with the present invention especially uniform dispersion of carbon black in polyolefins is obtained by subjecting the polymer to ionizing radiation prior to its admixture with the carbon black. After the polymer is subjected to the ionizing radiation treatment, it is then blended with the carbon black to form highly homogeneous dispersions.

The polymers useful in the process of the present invention are synthetic resins made by polymerizing nonaromatic hydrocarbon mono-olefins having from 2 to 6 carbon atoms. Representative examples of such polymers are polyethylene, polypropylene, copolymers of ethylene and propylene, copolymers of propylene and 1-butene, and so forth, having molecular weights of 2000 and upwards to 150,000 or more. Such polymers can be made by high or low pressure polymerization process as is known to the art. It is preferred to use those polymers having molecular weights between 10,000 and 50,000. The molecular weights referred to herein are obtained by measurement of solution viscosity according to the method of Fikentscher.

Ordinary carbon blacks including channel blacks, lamp blacks, furnace blacks, and acetylene black having particle sizes between about 50 and 5000 Angstrom units are suitable for use in this invention. It is preferred, however, for purposes of the present invention to use carbon blacks having an average particle size of between 50 and 250 A. since such blacks impart to the product the maximum resistance to degradation of the polymer.

The ionizing radiation suitable for use in treating polyolefins in the process of the present invention can be obtained from any of various high energy sources and can be of various types whether regarded as having corpuscular or wave form. Representative types of ionizing radiation sometimes referred to as "high energy" radiation are alpha rays, beta rays, gamma rays, X-rays, electron beams, high energy neutrons and the like, including radiations such as thermal neutrons, which in themselves may not be ionizing but give rise to ionizing radiation.

The amount of radiation employed in the process of the present invention can be very small. As little as 0.0005 megarad, a rad being a unit of absorbed energy equal to 100 ergs per gram of material irradiated, is effective to improve the uniformity of dispersion of carbon black in polyolefins. As much as 10 megarads or more of ionizing radiations can be used for purposes of the present invention. Doses of from 0.005 to 5 megarads have been found convenient to administer but in the interest of economy and the saving of time and energy it is preferred to use doses of about 0.2 megarad.

The compositions produced according to the method of the present invention can contain as small an amount as ½ percent to as much as 50 percent carbon black. Such compositions can be made by milling the desired amount of carbon black into the polymer in a single mixing step after the polymer has been irradiated. For compositions containing percentages in the lower end of the above mentioned range, for example, 1–5 percent carbon black, it is preferred to make a concentrate of carbon black in irradiated polymer and then to cut or extend the concentrate with additional polymer. The polymer used to extend the concentrate need not be of the same molecular weight, or mad by the same process or from the same olefin monomer as the polymer that is used to make the concentrate. The extending polymer can be irradiated prior to admixture with the concentrate, but such irradiation is not essential to the present invention. After forming the compositions of the present invention into the shape in which they will ultimately be used, the shaped articles can be irradiated to further improve their chemical and physical properties, if desired.

In carrying the invention into practical effect, the solid polymers or copolymers or mixtures thereof can be mixed with the carbon black on a roll mill or an internal mixer such as a Banbury mixer or a mixing extruder.

In the following examples, which are illustrative of this invention, parts and percentages are parts and percentages by weight unless otherwise indicated.

EXAMPLE I

A sample of 975 parts of polyethylene pellets, ¼ inch in diameter and ⅜ inch in length is divided into two portions, one of 75 parts and the other of 900 parts. The polyethylene has an average molecular weight of 31,200 (determined according to Fikentscher using a 0.1 percent solution in decaline at 135° C.). The 75 parts are placed on a moving conveyor belt and by means of a vibrator, operatively connected to a feed hopper, the pellets are spread out one deep on the belt. The pellets are carried by the belt through an electron beam and subjected to a dose of 2 megarads of ionizing radiation from the electron beam of a one million electron volt resonant transformer operated at beam current of one milliampere. The thus irradiated polymer is then admixed with 25 parts of carbon black having an average particle diameter of 180 A. for 45 minutes in a size "B" Banbury mixer heated to a temperature of 160° C. to form 100 parts of a concentrate. The concentrate is passed through an extruder and repelletized. The pelletized concentrate is dryblended in a rotating drum with an extending medium comprising the 900 parts of untreated polyethylene pellets above referred to and the blend is put through a screw extruder. The black product is a uniform blend containing 97½ percent polyethylene and 2½ percent carbon black in intimate admixture.

In order to determine the quality of the dispersion of the carbon black in the polyethylene, the following procedure is employed: A 0.002 gram sample of the dispersion is placed on a clean, standard microscope slide, (75 mm. x 25 mm.). A second standard microscope slide is placed on top of the sample forming a sandwich of the two slides with the sample to be tested between the slides. The sandwich is placed in a slide holder on a hot plate whose temperature has previously been adjusted to 275° C. A 1600 gram weight is placed on top of the sandwich. The sample softens and flows outwardly to form a roughly circular film approximately ½ inch in diameter and having a thickness of about 0.001 inch. The specimen is placed on one stage of a 100 power comparison microscope using a 100 watt daylight bulb as a substage source of illumination. A series of 10 standard slides, having varying degrees of uniformity of dispersion of mixtures of carbon black in polymer is used to determine the uniformity of dispersion of the carbon black in the specimen. The slides are numbered from 1 to 10, the slide numbered 1 having the most uniformly dispersed mixture of carbon black in polymer and each successively higher numbered slide having a less uniformly dispersed admixture of carbon black in polymer than the adjacent lower numbered slide. The specimen is compared at a magnification of 100 diameters with the standard slides and is given a numerical dispersion rating corresponding to the number of the standard slide it most closely resembles. When a specimen has a dispersion intermediate adjacent standard numbers, it is given a rating of ½ plus the number of the lower numbered standard. The polymer-carbon black mixture of Example I has a dispersion rating of 2½.

By contrast, a specimen made in accordance with the procedure of Example I, except that the irradiation step is omitted, has a dispersion rating of 8.

EXAMPLES II THROUGH IV

The procedure of Example I is repeated using the same materials and proportions except that polyethylenes of different molecular weights are employed. The dispersion ratings obtained are given in Table I along with dispersion ratings of unirradiated samples for purposes of contrast.

*Table I*

| Example | M. Wt. | Dispersion rating (irradiated) | Dispersion rating (unirradiated) |
|---|---|---|---|
| II | 42,400 | 2 | 8 |
| III | 26,500 | 3½ | 7 |
| IV | 32,900 | 3 | 6 |

EXAMPLES V THROUGH XI

The procedure of Example II is repeated using the same materials and proportions except that the irradiation dose is varied as indicated in Table II along with the results obtained.

*Table II*

| Example | Dose (megarads) | Dispersion rating |
|---|---|---|
| V | 0.005 | 4 |
| VI | 0.02 | 3 |
| VII | 0.05 | 3 |
| VIII | 0.1 | 4 |
| IX | 0.23 | 3 |
| X | 0.69 | 2 |
| XI | 4.14 | 3 |

EXAMPLE XII

In this example, the procedure of Example II is repeated using the same materials and proportions except that the resin is exposed to gamma radiation from a cobalt-60 source instead of exposure to electron beam radiation. The polymer is given a dose of 0.05 megarad from the cobalt-60 source and is then admixed with carbon black. The concentrate thus obtained is extended with untreated polyethylene to form a dispersion containing 2½ percent carbon black. When tested in the manner described above, this dispersion has a rating of 4.

EXAMPLE XIII

Example I is repeated except that the dose is changed to 0.98 megarad. This black polyethylene when tested according to the procedure above described has a dispersion rating of 3.

EXAMPLE XIV

Example III is repeated except that the polymer is given a dose of 2.4 megarads instead of the dose given the polymer in Example III. This product has a dispersion rating of 4.

EXAMPLES XV THROUGH XVIII

Polyethylenes having molecular weights shown in Table III are subjected to a dose of ionizing radiation in the amount of 0.22 megarad according to the procedure described in Example I. They are then separately mixed with carbon black to form concentrates. The concentrates are extended and tested in the manner described in Example I. The dispersion ratings of these products are given in Table III along with dispersion ratings for unirradiated samples for the purpose of contrast.

*Table III*

| Example | M. Wt. | Dispersion rating (irradiated) | Dispersion rating (unirradiated) |
|---|---|---|---|
| XV | 32,900 | 2½ | 6 |
| XVI | 24,600 | 2½ | 7 |
| XVIII | 24,100 | 2 | 7 |
| XVIII | 46,000 | 4 | 8 |

EXAMPLE XIX

A sample of 975 parts of polyethylene having a molecular weight of 42,400 (determined according to Fikentscher using a 0.1 percent solution decaline solution at a temperature of 135° C.) is obtained in pellet form. The entire sample is placed on a conveyor belt and spread to a uniform depth. The layer is carried by the belt through an electron beam generator and subjected to a dose of 0.23 megarad of ionizing radiation from the electron beam of a one million electron volt resonant transformer operated at a beam current of one milliampere. The thus irradiated polymer is then divided into two portions, one of 75 parts and the other of 900 parts. The smaller portion is then admixed with 25 parts of carbon black, having an average particle diameter of 180 A., in a type "B" Banbury mixer for 45 minutes during which time the temperature of the mixer was maintained at 160° C. The 100 parts of concentrate made in this manner is then mixed with the 900 parts of polyethylene above referred to on a 6 x 12 inch open-face Farrel-Birmingham roll mill for a period of 25 minutes at a temperature of 165° C. The product contains 2½ percent carbon black and 97½ percent polyethylene in a uniform blend.

The product, tested according to the procedure described in Example I, has a dispersion rating of 3.

EXAMPLES XX AND XXI

The process of Example XIX is repeated using the same materials and proportions except that in Example XX the dose is increased to 0.69 megarad and in Example XXI the dose is increased to 1 megarad. The products obtained have dispersion ratings of 2 and 3, respectively.

EXAMPLE XXII

The process of Example XXI is repeated using a polyethylene having a modecular weight of 32,900. Upon testing, a dispersion rating of 4 is obtained.

EXAMPLE XXIII

The process of Example XX is repeated using the same materials and proportions except that the beam generator is operated at a current of 3 milliamperes. This product has a dispersion rating of 4.

EXAMPLES XXIV AND XXV

The process of Example XIX is repeated using a beam generator current of 6 milliamperes. In Example XXIV, a dose of 2.76 megarads is given to the polymer and in Example XXV, a dose of 4.14 megarads is used. The products obtained in this manner have dispersion ratings of 5 and 3, respectively.

In a manner similar to the foregoing examples polypropylene is subjected to ionizing irradiation and then mixed with carbon black, and a copolymer of ethylene and propylene is subjected to ionizing radiation and then mixed with carbon black each producing dispersions of improved uniformity smiliar to those obtained in the foregoing examples.

When desired, compositions made in accordance with the present invention can contain additives in addition to carbon black, such as plasticizers, antioxidants, fillers and resinous materials other than polyolefins. The compositions produced by the present invention can be fabricated by known techniques into films, fibers, containers, toys, coatings, wire coverings, laminates and a myriad of other useful articles.

That which is claimed is:

1. A process for the production of an intimate dispersion of carbon black and a solid polymer of a lower non-aromatic hydrocarbon mono-olefin which comprises subjecting the polymer to ionizing radiation and subsequently admixing carbon black therewith.

2. A process according to claim 1 in which the polymer is polyethylene.

3. A process according to claim 1 in which the polymer is polypropylene.

4. A process according to claim 1 in which the polymer is a copolymer of ethylene and propylene.

5. A process according to claim 1 in which the polymer is subjected to between 0.0005 and 10 megarads of ionizing radiation.

6. A process according to claim 1 in which the polymer is subjected to from 0.005 to 5 megarads of ionizing radiation.

7. A process according to claim 1 in which the carbon black particles have an average diameter of between 50 and 250 Angstrom units.

8. A process according to claim 1 in which the ionizing radiation is an electron beam.

9. A process according to claim 1 which comprises the further step of mixing additional resin with the product of claim 1 to extend the dispersion.

10. A process for the production of an intimate mixture of carbon black having an average particle size of from 50 to 250 Angstrom units with a synthetic resin which comprises subjecting the resin to from 0.005 to 5 megarads of ionizing radiation from an electron beam source, mixing the so-treated resin with the carbon black to form a concentrate and mixing the concentrate with additional resin to produce a substantially homogeneous extended dispersion of carbon black in the resin, the resin being selected from the group consisting of polyethylene, polypropylene, copolymers of ethylene and propylene, and mixtures thereof.

11. A process according to claim 10 in which the concentrate contains about 25 percent by weight of carbon black and the extended dispersion contains about 2½ percent by weight of carbon black.

References Cited in the file of this patent

FOREIGN PATENTS 820,168    Great Britain _____ Sept. 16, 1959

OTHER REFERENCES

Chemical and Engineering News, Volume 33 (November 1955), pages 5091–2.